United States Patent [19]

Iglehart et al.

[11] Patent Number: 5,857,019
[45] Date of Patent: *Jan. 5, 1999

[54] APPARATUS AND METHOD FOR PROVIDING A TELEPHONE USER WITH CONTROL OF THE THRESHOLD VOLUME AT WHICH THE USER'S VOICE WILL TAKE CONTROL OF A HALF-DUPLEX SPEAKERPHONE CONVERSATION

[75] Inventors: David Iglehart; Leland Lester, both of Austin; Joel Q. Adams; Geof Findley, both of Pflugerville, all of Tex.

[73] Assignee: Siemens Business Communication Systems, Inc., Santa Clara, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 662,569

[22] Filed: Jun. 11, 1996

[51] Int. Cl.⁶ ..................................................... H04M 9/00
[52] U.S. Cl. .......................... 379/389; 379/390; 379/409; 379/420; 381/110
[58] Field of Search ..................................... 379/389, 390, 379/388, 387, 391, 392, 395, 420, 432, 410, 411; 381/104, 110

[56] References Cited

U.S. PATENT DOCUMENTS

| 4,879,745 | 11/1989 | Arbel | 379/390 |
| 5,170,430 | 12/1992 | Schuh | 379/390 |
| 5,485,515 | 1/1996 | Allen et al. | 379/391 |
| 5,544,242 | 8/1996 | Robinson | 379/389 |
| 5,559,880 | 9/1996 | Shiono | 379/389 |

*Primary Examiner*—Daniel S. Hunter
*Assistant Examiner*—Jacques Saint-Surin

[57] ABSTRACT

An improved speakerphone that may be viewed as a modification of a conventional half-duplex speakerphone that includes transmit and receive attenuators for alternatively isolating either a speaker or a microphone from a phone line. The attenuators are controlled by a controller that compares a signal generated by the microphone with a signal received on the phone line to determine which of the transmit or receive attenuators should be turned on. In the present invention, a first variable gain amplifier is connected so as to amplify the signal generated by the microphone prior to the signal being connected to the controller, and a second variable gain amplifier is connected so as to amplify the signal received on the phone line prior to the signal being connected to the controller. The first and second variable gain amplifiers have adjustable gain controls that are connected such that the gain of the first variable amplifier is decreased when the gain of the second variable amplifier is increased and vice versa. The adjustable gain control of one of the adjustable gain amplifiers is accessible to the user of the speakerphone and allows the user to adjust the threshold at which his voice will take over the conversation.

4 Claims, 2 Drawing Sheets

APPARATUS AND METHOD FOR PROVIDING A TELEPHONE USER WITH CONTROL OF THE THRESHOLD VOLUME AT WHICH THE USER'S VOICE WILL TAKE CONTROL OF A HALF-DUPLEX SPEAKERPHONE CONVERSATION

FIELD OF THE INVENTION

The present invention relates to telephones, and more particularly, to speakerphones.

BACKGROUND OF THE INVENTION

Speakerphones allow several users at one end of a telephone connection to participate in the telephone conversation. Even in the case of a telephone conversation between two users, a speakerphone provides the advantage of allowing the user to participate in the conversation without having to hold a handset or wear a headset. Such hands-free operation gives the user the freedom to move about the room or type at a computer terminal while participating in the conversation.

Speakerphones have, however, one severe drawback. By necessity, the microphone of the speakerphone is nearer to the speaker in the speakerphone than to the user. Hence, feedback can become a problem if the speakerphone is run in full-duplex mode. While full-duplex speakerphones are known in the art, such speakerphones are relatively expensive. Hence, to solve the feedback problem in inexpensive speakerphones, the speakerphone is run in a half-duplex mode in which an internal monitoring circuit switches the speakerphone between "send" and "receive" modes thereby preventing the acoustical output of the speaker from being picked up by the microphone and causing feedback.

The internal monitoring circuit operates by detecting the voltages from the audio downlink from the telephone line and the voltage at the microphone of the speakerphone. A pair of attenuators are used to alternatively isolate the speaker or the microphone from the phone line. The attenuators are controlled by comparing the voice level on the microphone with the voice level being received on the telephone line. When the voice level at the microphone exceeds that on the incoming line by a predetermined amount, the microphone is given control of the telephone line and the speaker input is attenuated. When the level at the microphone drops below a level determined by a threshold value and the signal level on the telephone line, the output of the microphone is attenuated and the attenuation of the speaker input is removed.

The effective threshold at which a person using the speakerphone can take over a conversation depends on the signal level on the telephone line. If the person on the other end of the conversation speaks loudly, the speakerphone user must raise his or her voice to actuate the microphone of the speakerphone to gain control of the conversation. This problem with speakerphones often forces the user to speak at a level that is unnatural for that person. In some cases, the speakerphone user may be perceived as speaking in a rude manner when the user is merely trying to overcome a loud-voiced speaker at the other end of the conversation.

Broadly, it is the object of the present invention to provide an improved speakerphone.

It is a further object of the present invention to provide a speakerphone in which the user can adjust the level at which the user's voice causes the microphone on the user's speakerphone to take control of the speakerphone.

These and other objects of the present invention will become apparent to those skilled in the art from the following detailed description of the invention and the accompanying drawings.

SUMMARY OF THE INVENTION

The present invention is an improved speakerphone which may be viewed as a modification of a conventional half-duplex speakerphone that includes transmit and receive attenuators for alternatively isolating either a speaker or a microphone from a phone line. The attenuators are controlled by a controller that compares a signal generated by the microphone with a signal received on the phone line to determine which of the transmit or receive attenuators should be turned on. In the present invention, a first variable gain amplifier is connected so as to amplify the signal generated by the microphone prior to the signal being connected to the controller, and a second variable gain amplifier is connected so as to amplify the signal received on the phone line prior to the signal being connected to the controller. The first and second variable gain amplifiers have adjustable gain controls that are connected such that the gain of the first variable amplifier is decreased when the gain of the second variable amplifier is increased and vice versa. The adjustable gain control of one of the adjustable gain amplifiers is accessible to the user of the speakerphone and allows the user to adjust the threshold at which his voice will take over the conversation.

DETAILED DESCRIPTION OF THE INVENTION

Figure 1:
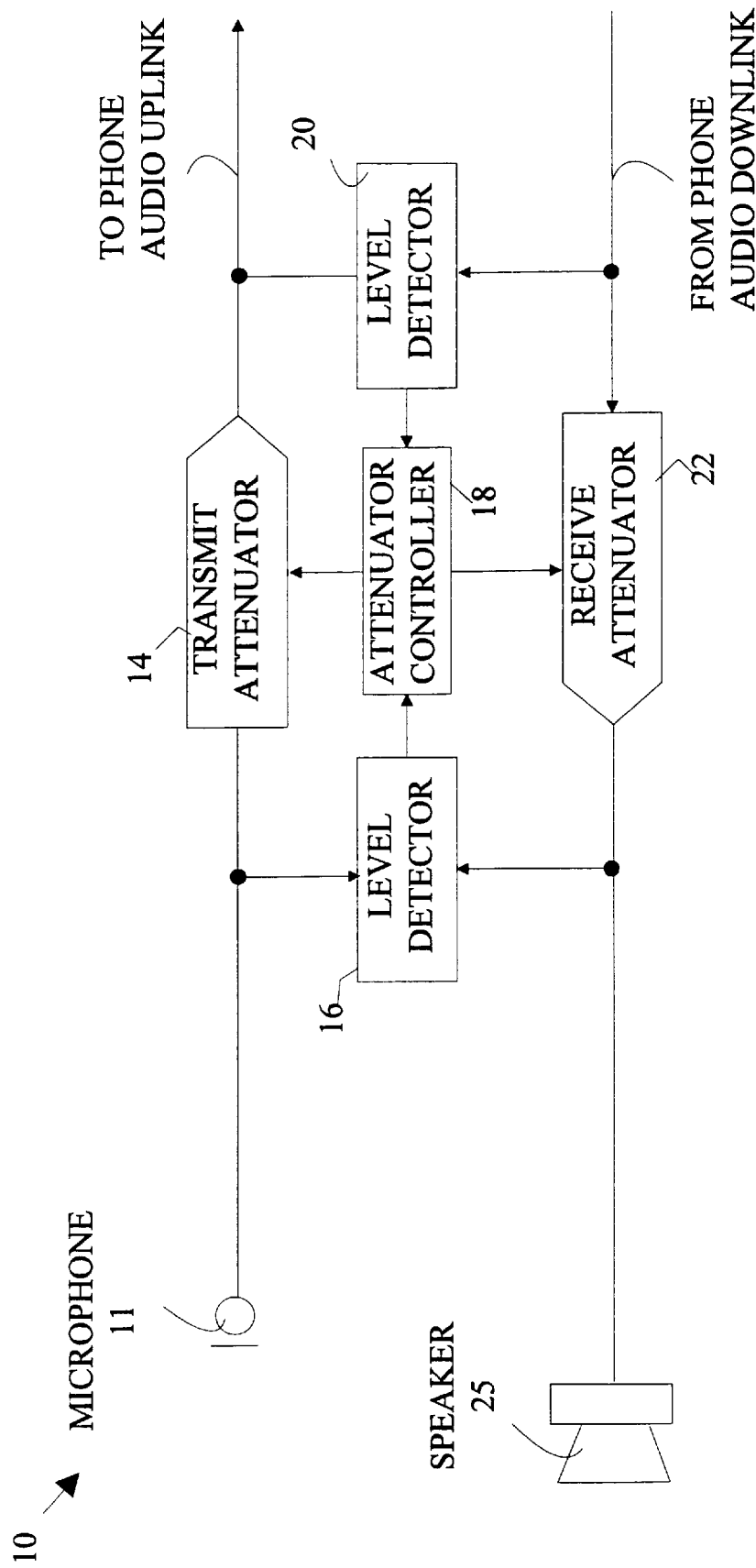
FIG. 1 is a block diagram of speakerphone from the background art.

The present invention is an improved speakerphone that provides the user with a manually operated control that allows the user to adjust the threshold at which the user's voice will take control of the speakerphone. The manner in which this is accomplished may be more easily understood with reference to FIG. 1 which is a block diagram of a conventional speakerphone. In a conventional speakerphone 10, a pair of attenuators shown at 14 and 22 are used to control whether the speaker 25 or the microphone 11 has control of the phone line. For the purposes of this discussion, it will also be noted that microphone 11 and speaker 25 may include various interface circuitry. In particular, microphones normally include a preamplifier for amplifying the signal generated therein. Likewise, a power amplifier is often used in conjunction with the speaker. Since these components are known in the art and not relevant to the novel features of the present invention, they have been omitted from the drawings.

The levels on the audio uplink and downlink for the phone line are detected by a first level detector 20. Similarly, the levels from the microphone preamp and phone downlink after attenuation are detected by level detector 16. The outputs of level detectors 16 and 20 are input to controller 18 which controls the transmit and receive attenuators such that one attenuator is on and one attenuator is off at any given time. For the purposes of this discussion, an attenuator will be considered to be on if the attenuator is attenuating the signal passing therethrough.

Consider the case in which transmit attenuator 14 is on and receive attenuator 22 is off. In this case, the party at the other end of the phone line is controlling the conversation. When the output of microphone 11 exceeds the signal level at the input to speaker 25 by a predetermined amount, level detector 16 generates a trigger signal that is input to controller 18. Controller 18 then switches the attenuators such that transmit attenuator 14 is off and receive attenuator 22 is on. The user of microphone 11 now has control of the conversation. Since the level at which the switch occurs depends on the level at the input of speaker 25, the speaker must adjust his or her voice to compensate for the level generated by the party at the other end of the phone line to gain control of the conversation.

Similarly, in the case in which transmit attenuator 14 is off and receive attenuator 22 is on, level detector 20 controls the switching. When the level at the input to receive attenuator 22 exceeds the output of microphone 11 as seen through transmit attenuator 14, attenuator controller 18 switches the attenuators so that transmit attenuator 14 is on and the person at the other end of the phone line is given control of the conversation. As noted above, the dependence of the switch points on the relative speech intensities of the two participants is an undesirable situation which the present invention overcomes.

Figure 2:
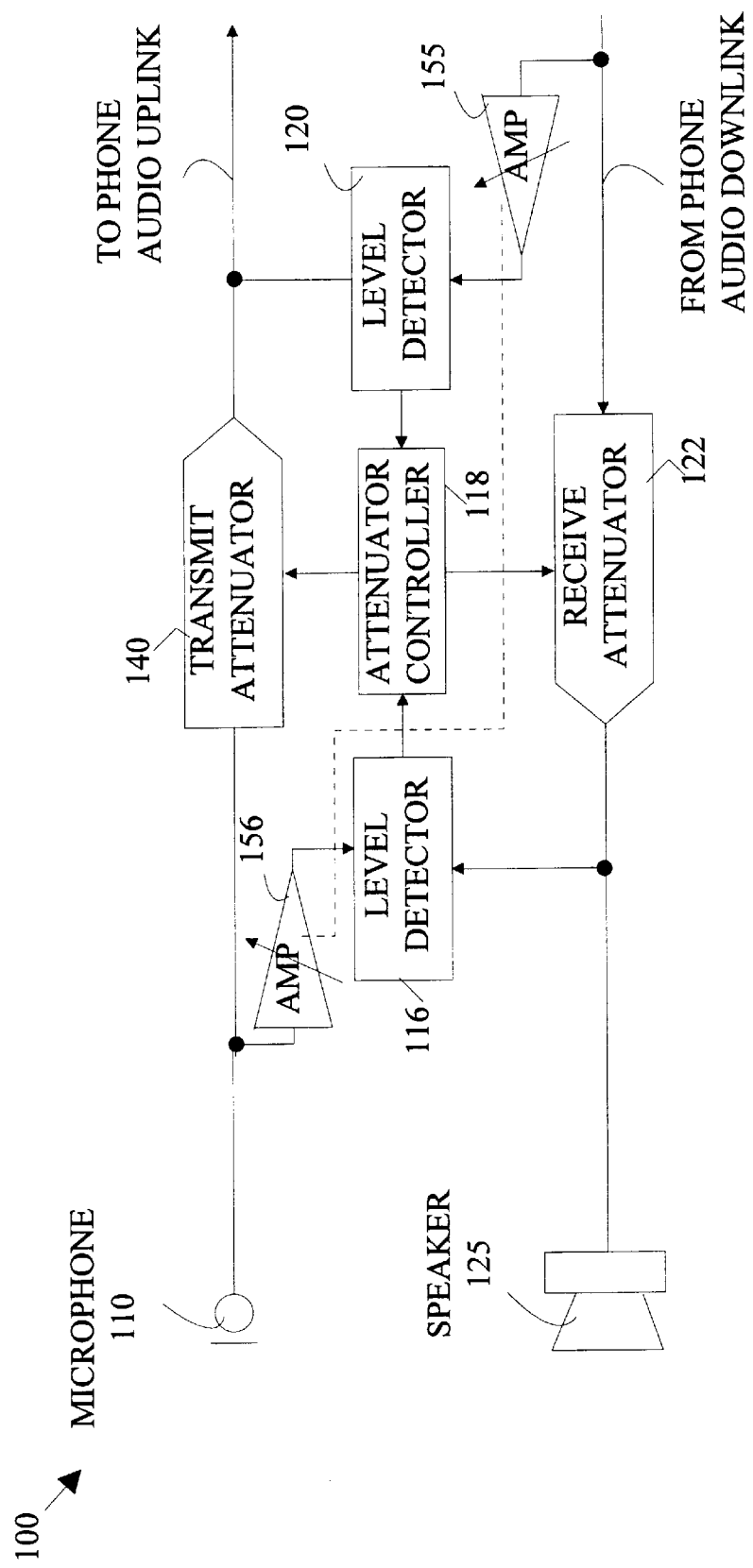
FIG. 2 is a block diagram of a speakerphone according to the present invention.

Refer now to FIG. 2 which is a block diagram of a speakerphone 100 according to the present invention. To simplify the following discussion, those functional blocks which serve the same function as a functional block shown in FIG. 1 are numbered with reference numbers that differ from the corresponding reference numbers in FIG. 1 by 100. These elements will not be discussed in detail, as their functions have already been explained. Speakerphone 100 differs from speakerphone 10 in that a pair of variable gain amplifiers 155 and 156 have been added to the attenuation control level detectors. The amplifiers are ganged such that the gain of one amplifier decreases as the gain of the other amplifier is increased and vice versa. Amplifier 156 alters the input to level detector 116 and amplifier 155 alters the input to level detector 120. As the gain of amplifier 156 is increased, the attenuator controller operates as if the user at microphone 110 were speaking louder relative to the speaker on the other end of the conversation. Similarly, as the gain of amplifier 156 is decreased, the gain of amplifier 155 is increased and attenuation controller 118 operates as if the voice of the user at microphone 110 were softer relative to the speaker on the other end of the conversation. Thus, by adjusting the ganged amplifier controls, the user of the speakerphone can manually adjust the level at which his or her voice will override the speakerphone controller and take control of the conversation.

While the above described embodiment of the present invention has been described in terms of two variable gain amplifiers, it will be apparent to those skilled in the art that ganged variable attenuation attenuators can also be used. Hence, the term "amplifier" as used herein includes attenuators.

While the above described embodiment of the present invention has been described in terms of two attenuators for alternatively isolating the speaker or microphone, it will be apparent to those skilled in the art that switches can also be used in place of the attenuators. Hence, the term "attenuator" as used herein includes switches.

Various modifications to the present invention will become apparent to those skilled in the art from the foregoing description and accompanying drawings. Accordingly, the present invention is to be limited solely by the scope of the following claims.

What is claimed is:

1. A half-duplex speakerphone comprising:

a microphone for generating a signal to be placed on a phone line;

a speaker for generating an audio signal from an input signal, the input signal being determined by a signal received on the phone line;

a transmit attenuator connected between the microphone and the phone line for isolating the microphone from the phone line when the transmit attenuator is on, the transmit attenuator generating an output signal that is placed on the phone line when the transmit attenuator is off;

a receive attenuator connected between the phone line and the speaker for isolating the speaker from the phone line when the receive attenuator is on;

attenuator controller for controlling the transmit and receiver attenuators such that one attenuator is on and one attenuator is off at any given time;

a first variable amplifier having an input connected to the output of the microphone and an output connected to a first level detector, the first level detector comparing the output of the first variable amplifier and the signal at the input of the speaker and generating a comparison signal that is input to the attenuator controller;

a second variable amplifier having an input connected to the input of the receive attenuator and an output connected to a second level detector, the second level detector comparing the output of the second variable amplifier and the output signal of the transmit attenuator and generating a comparison signal that is input to the attenuator controller, wherein the attenuation controller turns on the transmit attenuator when the second level detector indicates that the output of the second variable amplifier exceeds the signal level at the output of the transmit attenuator by a predetermined amount, wherein the attenuation controller turns on the receive attenuator when the first level detector indicates that the output of the first variable amplifier exceeds the input to the speaker by a predetermined amount, and wherein the first and second variable gain amplifiers include adjustable gain controls that are connected such that the gain of the first variable amplifier is decreased when the gain of the second variable amplifier is increased and vice versa, the adjustable gain controls being adjustable by a user of the speakerphone.

2. A speakerphone as in claim 1, wherein said adjustable gain controls are adjustable by a user of the speakerphone while the speakerphone is in use.

3. In a half-duplex speakerphone that includes transmit and receive attenuators for alternatively isolating either a speaker or a microphone from a phone line, the attenuators being controlled by a controller that compares a signal generated by the microphone with a signal received on the phone line to determine which of the transmit or receive attenuators should be turned on, the improvement comprising providing first and second variable gain amplifiers, the first variable gain amplifier being connected so as to amplify the signal generated by the microphone prior to the signal being connected to the controller, and the second variable gain amplifier being connected so as to amplify the signal received on the phone line prior to the signal being connected to the controller, the first and second variable gain amplifiers having adjustable gain controls that are connected such that the gain of the first variable amplifier is decreased when the gain of the second variable amplifier is increased and vice versa, the adjustable gain controls being adjustable by a user of the speakerphone.

4. A speakerphone as in claim 3, wherein said adjustable gain controls are adjustable by a user of the speakerphone while the speakerphone is in use.

* * * * *